United States Patent Office 2,748,126
Patented May 29, 1956

2,748,126

PHENYLCYCLOALKYLCARBINYL PIPERAZINES AND METHOD OF MAKING

Richard Baltzly, Tuckahoe, and Peter B. Russell, Crestwood, N. Y., assignors to Burroughs Wellcome & Co. (U. S. A.) Inc., Tuckahoe, N. Y., a corporation of New York No Drawing. Application July 9, 1954,
Serial No. 442,431

9 Claims. (Cl. 260—268)

The present invention relates to a group of phenylcycloalkylcarbinyl piperazines having novel and unexpected spasmolytic properties. In a copending application, No. 287,604, to which the present case is a continuation-in-part, it is revealed that quaternary ammonium salts of the formula

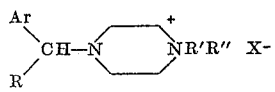

wherein Ar is a phenyl radical, R is a cycloalkyl radical, R' and R" are lower alkyl radicals and X− is an anion, have valuable spasmolytic properties. These compounds are prepared by quaternization of the appropriate tertiary base which in turn has been formed by the reaction of a halide

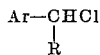

base such as N-methyl or N-ethylpiperazine.

While the benzhydryl halides combine readily with the piperazine base of the type indicated, the halides Ar—CHClR such as hexahydrobenzhydryl chloride react very slowly to give poor yields of relatively impure products. For example, benzhydryl chloride and methylpiperazine after about six hours on the steam bath afford an 80% yield of benzhydryl methyl piperazine which is substantially pure as isolated. In contrast, hexahydrobenzhydryl chloride and methylpiperazine after about seventy hours give around a 40% yield of a base from which only a portion can be recovered as a pure salt. The causes for this discouraging behavior can be deduced from theoretical consideration but are not especially pertinent to the present discussion in which we present an entirely different line of synthesis.

In accordance with the present invention a novel method is provided for the preparation of highly active spasmolytic derivatives in substantial yield. In the present scheme, trans amino alcohols represented by Formula I are initially prepared in accordance with the method described in our copending application No. 409,764 of which this is a continuation-in-part. In this formula Ar is a phenyl radical, R' is a lower alkyl radical and n is an integer having the values 4 and 5. The amino alcohol prepared in the foregoing manner is dissolved in an inactive base, preferably pyridine, and then reacted with a sulfone-chloride to give a sulfonate of Formula II. Z is the

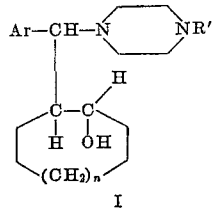

I

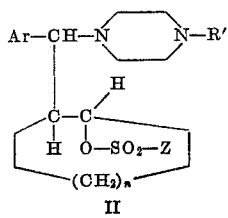

II hydrocarbon radical of a convenient sulfone chloride. Most frequently p-toluene sulfone chloride is used since it is cheap and as good as any other. However, benzene sulfonyl chloride, p-bromobenzenesulfonyl chloride, methane sulfonyl chloride or the like are also satisfactory. Since the entire moiety Z—$SO_2$—O— is removed in the next step the particular identity of Z is relatively unimportant.

Replacement of the portion Z—$SO_2$—O by hydrogen is accomplished by reducing the Compound II by a complex metal hydride such as lithium aluminum hydride or sodiumborohydride or sodium trimethoxy borohydride In this way the desired product (III) is obtained in high yield and in a state of substantial purity.

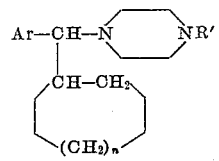

III

EXAMPLE 1

*Trans-2-[α-(N-methyl-N'-piperazino) benzyl]-cyclohexan-ol-p-toluene sulfonate*

The trans alcohol (5 g.) and p-toluenesulfonylchloride (10 g.) were dissolved in pyridine (30 ml.). The solution was allowed to stand at room temperature for three days and then poured onto a mixture of ice (500 g.) and sodium carbonate. If necessary more sodium carbonate was added to keep the solution well on the alkaline side. If the oily precipitate solidified it was filtered off but occasionally it was necessary to extract the oil with ether. After washing the solid (or ethereal solution) exhaustively with water it (or residue after removal of the ether) was recrystallized from a mixture of ether and pentane. Colorless prisms, M. P. 119° (5.2 g.).

REDUCTION OF THE ABOVE TOSYL DERIVATIVE WITH LITHIUM ALUMINUM HYDRIDE

To lithium aluminum hydride (0.4 g.) in ether (50 ml.) (the mixed hydride is partly dissolved, partly suspended) was added a solution of the tosylate (3.7 g.) in ether (ca. 150 ml.). The reaction mixture was refluxed for 4–5 hours and then, after cooling, water (in all some 15 ml.) was added to decompose the excess reagent. The ether solution was separated, washed well with water, and dried over sodium sulfate. Evaporation of the ether gave 2.5 g. of oil. This oil boiled at 90–100° (bath temperature)/0.2 mm. After distillation it solidified and after recrystallization from pentane it formed colorless crystals, M. P. 72–73°.

With isopropyliodide this base yielded a quaternary salt, M. P. 196.5° (dec.) identical with the sample described by the alternative method. With ethyl iodide a quaternary salt, M. P. 181–182° was obtained identical with a sample obtained by an alternative method.

EXAMPLE 2

*Trans-2-[α-(N-ethyl-N'-piperazino) benzyl] cyclohexan-2-ol-p-toluenesulfonate*

The corresponding trans alcohol ( 4 g.) was tosylated and the product isolated exactly as in the first example. The ester after recrystallization from ether-petroleum ether formed colorless prisms, M. P. 120°.

DETOSYLATION OF THE ABOVE ESTER

The above ester was reduced by lithium aluminum hydride exactly as in the previous example. The resulting basic oil gave with methyl iodide a quaternary salt (M. P. 180°) identical in all respects with the salt prepared in the previous example by the reaction of ethyl iodide on N-methyl-N'-hexahydrobenzhydrylpiperazine cyclohexane. With ethyl iodide it gave an ethiodide identical with the one prepared by an alternative route.

EXAMPLE 3

*Tosylation of trans-2-[α-(N-methyl-N'-piperazine)-o-chlorobenzyl]cyclohexanol*

The alcohol (2 g.) p-tosylchloride (4 g.) and pyridine (20 ml.) were allowed to stand for 7 days. The mixture was then poured into ice and sodium carbonate. The oil was extracted with ether and the ethereal extract washed with water. On removal of the ether, an oily residue remained which on dissolving in pentane crystallized. After recrystallization from ether, it formed colorless prisms, M. P. 129°.

REDUCTIVE DETOSYLATION OF THE ABOVE ESTER

The above tosylate (2 g.) was added to a solution of lithium aluminum hydride (0.75 g.) in ether (75 ml.) and the mixture refluxed for 5 hours. At the end of this time, the excess hydride was decomposed by the addition of water. The ethereal solution was washed well with water and dried. After evaporation, the product (1.3 g.) was distilled, B. P. 95/100°/1 mm.

The base was converted to its quaternary salts in the usual manner.

EXAMPLE 4

*Tosylation of 2-[α-(N-methyl-N'-piperazino)benzyl]-cycloheptanol*

The alcohol (2 g.), tosyl chloride (4 g.) and pyridine (12 ml.) were allowed to stand for 4 days. The product on working up in the usual manner gave a crystalline product (2.3 g.), M. P. 136° after recrystallization from hexane.

REDUCTIVE DETOSYLATION OF THE ABOVE ESTER

The above tosyl derivative (1 g.) was dissolved in ether (25 ml.) and added to a solution of lithium aluminum hydride (0.6 g.) in ether (50 ml.). The solution was refluxed for 5 hours and then the resulting base worked up as previously described. With ethyl iodide in acetone an ethyl iodide, M. P. 175° was obtained.

What is claimed is:

1. The method of preparing a compound of the formula

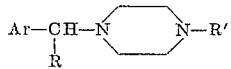

wherein R' is a lower alkyl radical and R is selected from the class consisting of the cyclohexyl and cycloheptyl radicals which comprises reacting an amino alcohol of the formula

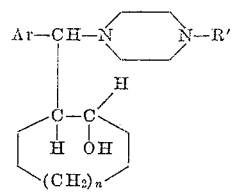

wherein $n$ is an integer from 4 to 5 and Ar and R' have the values previously assigned, with a reagent selected from the class consisting of the aryl and lower alkyl sulfonyl halides having not over seven carbon atoms to form the corresponding sulfonate ester of the amino alcohol and reducing this sulfonate with a reagent selected from the class consisting of lithium aluminum hydride and sodium borohydride and sodium trimethoxy borohydride to give the base of the formula first mentioned.

2. The method set forth in claim 1, wherein lithium aluminum hydride is reacted with the sulfonate.

3. The method set forth in claim 1, wherein sodium borohydride is reacted with the sulfonate.

4. The method set forth in claim 1, wherein p-toluene sulfonyl chloride is reacted with the amino alcohol.

5. A compound of the formula

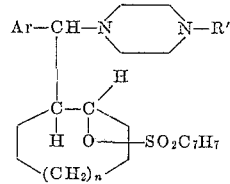

wherein Ar is a phenyl radical, R' is a lower alkyl radical, and $n$ is an integer from 4 to 5.

6. Trans-2-[α-(N-methyl-N'-piperazino) benzyl]-cyclohexyl-p-toluene sulfonate.

7. Trans-2-[α-(N-ethyl-N'-piperazino) benzyl]-cyclohexyl-p-toluene sulfonate.

8. Trans-2-[α-(N-methyl-N'-piperazino)-o-chlorobenzyl]-cyclohexyl-p-toluene sulfonate.

9. Trans-2-[α-(N-methyl-N'-piperazino) benzyl]-cycloheptyl-p-toluene sulfonate.

No references cited.